A. H. THOMAS.
COTTON PRESS.
APPLICATION FILED OCT. 13, 1908.
932,354.
Patented Aug. 24, 1909.
2 SHEETS—SHEET 1.
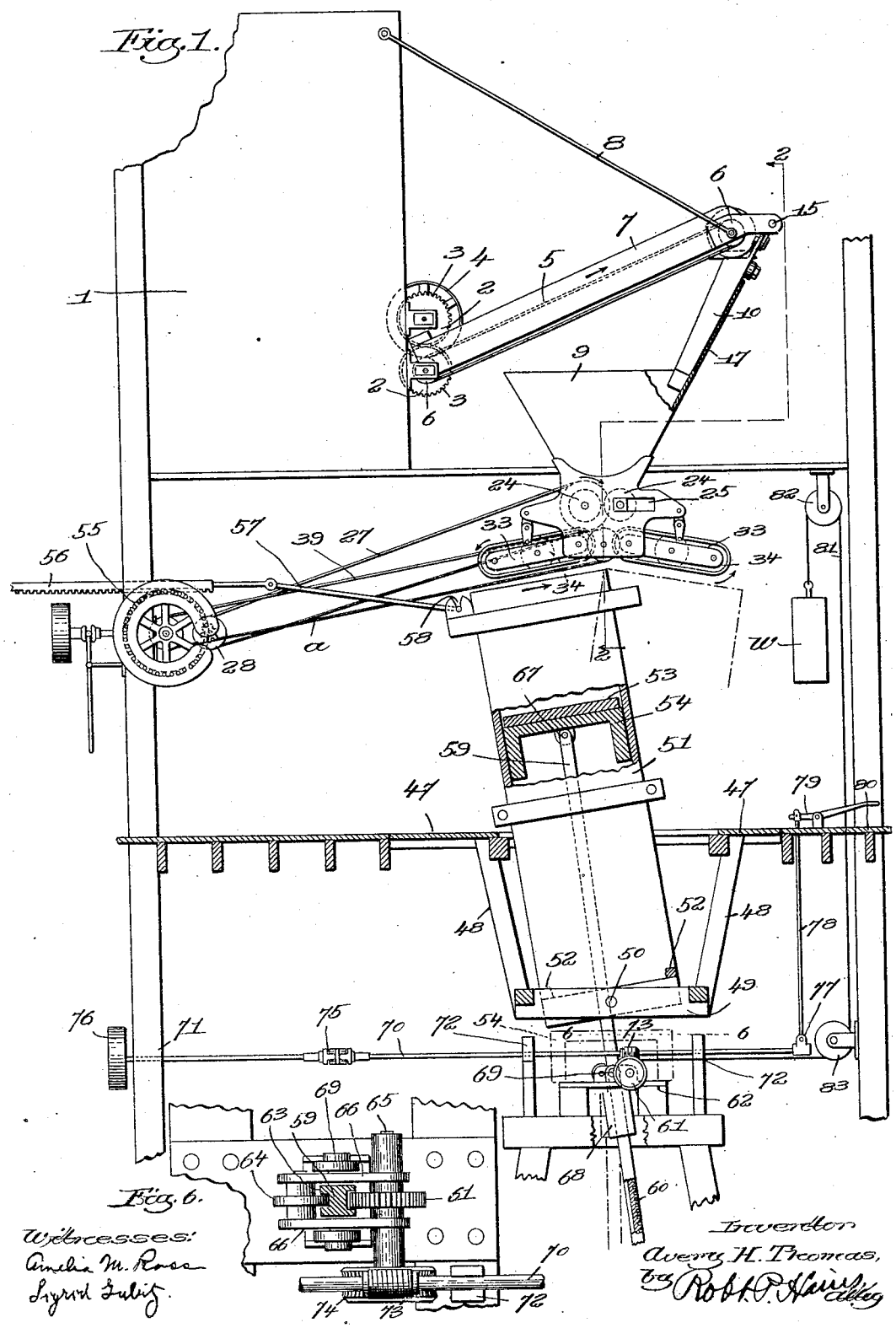

A. H. THOMAS.
COTTON PRESS.
APPLICATION FILED OCT. 13, 1908.
932,354.
Patented Aug. 24, 1909.
2 SHEETS—SHEET 2.
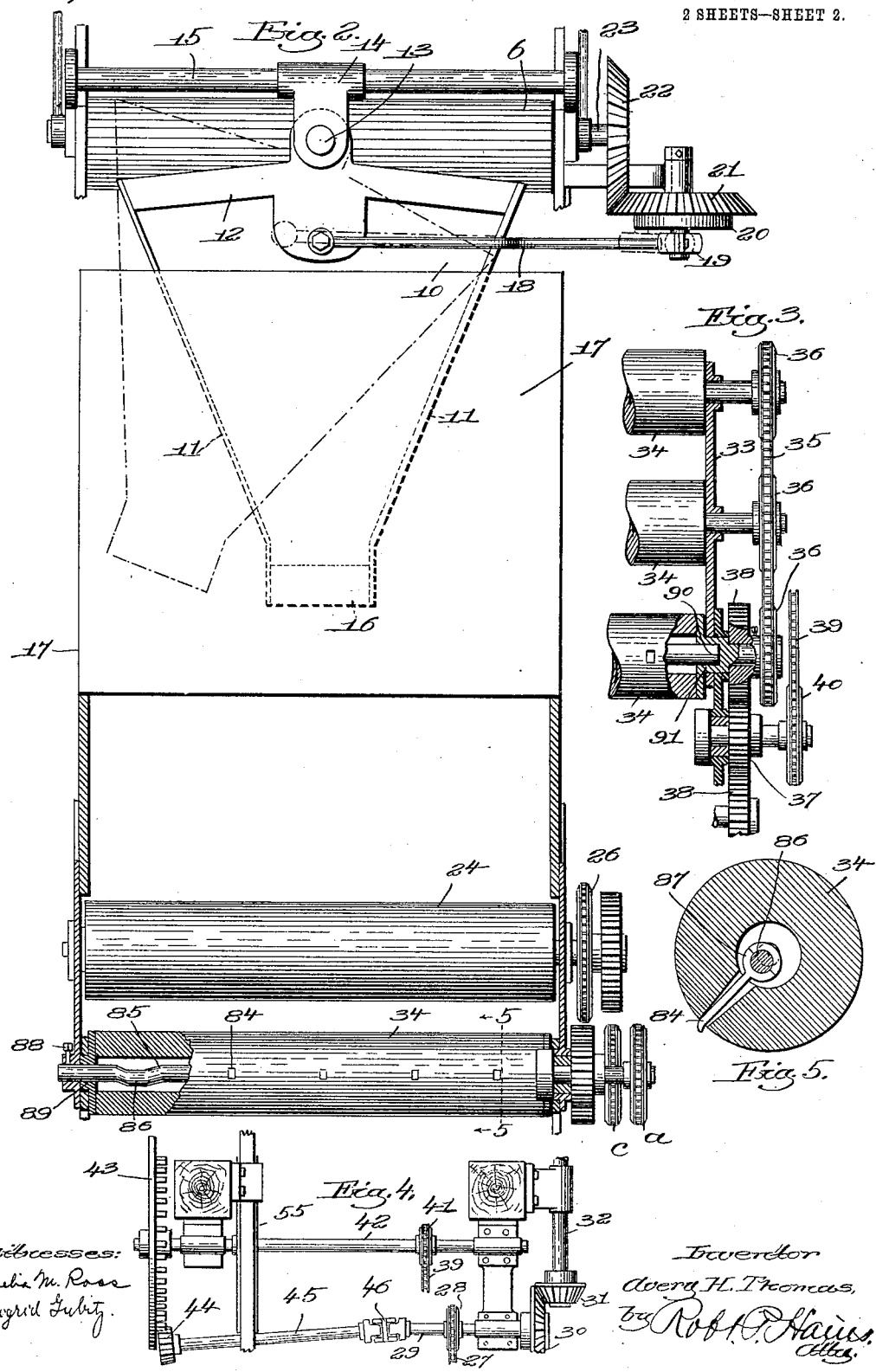

UNITED STATES PATENT OFFICE.

AVERY H. THOMAS, OF LITTLE ROCK, ARKANSAS.

COTTON-PRESS.

932,354.

Specification of Letters Patent.

Patented Aug. 24, 1909.

Application filed October 13, 1908. Serial No. 457,479.

*To all whom it may concern:*

Be it known that I, AVERY H. THOMAS, a citizen of the United States, residing at Little Rock, in the county of Pulaski and State of Arkansas, have invented an Improvement in Cotton-Presses, of which the following description, in connection with the accompanying drawings, is a specification, like numerals on the drawings representing like parts.

The invention to be hereinafter described relates to baling presses and more particularly to baling presses of the double revolving box type, wherein the cotton or like material is delivered into the bale-box in a continuous sheet, web, or bat against a receding follower.

The first prerequisite for making a perfect square lap bale of cotton is that the sheet, web, or bat be of uniform density or thickness throughout its entire width after passing between the compression rollers just prior to being folded in successive layers in the bale-box; and the next important consideration is that the successive layers be folded back and forth in an even and uniformly regular manner.

With these general considerations in view, the aim of the present invention is to provide a baling press of the character noted wherein the sheet, web, or bat of cotton, as it emerges from between the compression rollers, shall be of the same density and thickness throughout and shall be then folded back and forth with certainty and uniformity as to length of layer in the bale-box, all of which will hereinafter more fully and clearly appear in connection with the following description of one form or embodiment of the invention taken in connection with the accompanying drawings.

In the drawings:—Figure 1 is a general side elevation of a baling press embodying the features of the present invention, some of the parts being broken away to more clearly illustrate parts beyond; Fig. 2 is a section taken on the line 2—2 of Fig. 1, looking in the direction of the arrows; Fig. 3 is a detached detail partly in section of the end portions of the rollers which constitute the bale forming surface, showing the means for actuating them; Fig. 4 is a detached detail of one form of means for operating the bale forming rollers, the compression rollers, and the bale-box; Fig. 5 is a section on the line 5—5 of Fig. 2, showing the starting fingers on the front or middle roller of the set forming part of the bale forming surface; and Fig. 6 is a detail sectional view on the line 6—6, Fig. 1.

In the drawings, which typifies one form of double revolving box press, 1 is or may be a suitable cotton supply, as, for instance, a condenser, which delivers cotton in the form of a thin sheet from between the rollers 2, 2, geared to rotate in unison by the pinions 3, 3, and driven, by suitable belt connections with the pulley 4, onto an apron 5. The apron 5 passes about suitable rollers 6, 6, at opposite ends of the swinging support 7, which may be braced, as by the bar 8, from the frame of the apparatus.

Disposed below the apron 5 is the hopper 9 into which the cotton or like material to be baled is delivered in the form of a sheet from a condenser or other source of supply. Cotton so delivered is apt to be of varying thickness at different parts transversely thereof. For instance, the sheet or web may be thicker along one edge than along the other and in cross-section resemble somewhat an elongated wedge. If such form of web is permitted to pass through or between the usual compression rollers, it is evident not only that different degrees of compression will be transmitted to the different edge portions of the web and, consequently, a bat of cotton be formed having different densities, but one edge portion will be thicker than the other. The result of folding such a bat back and forth, layer upon layer, as is the case in a, so called, square bale, would be to form one side or end of the bale larger than the other, produce lack of homogenity in the bale itself, cause unequal strains upon the baling mechanism and consequent breakage.

Disposed between the source of cotton supply, whether it be a condenser or other means, and the hopper 9 is an evener or distributer 10, which receives the sheet or web of cotton from the apron 5 and properly distributes it in the hopper above the compression rolls, as will presently appear.

In the present form of the invention the evener or distributer 10 consists of the side directing portions 11, 11, secured to a top cross piece 12, which is pivoted at 13 upon a sleeve 14 mounted upon the rod 15 carried by the extended ends of the support 7, Figs. 1 and 2. The side directing portions 11, 11, of the evener or distributer preferably rest upon the extended side 17 of the hopper 9, Figs. 1 and 2, and converge to a discharge opening 16 within the hopper. The width of the evener or distributer at its upper portion is practically the same as or slightly greater than the width of the sheet or web of cotton delivered to it from the apron 5, and by its converging side portions 11, 11 it causes the said sheet or web to be condensed or narrowed widthwise as it passes to the discharge opening, such condensation being formed, it may be, by infolding the sides of the sheet or web.

In order to evenly or properly distribute the laterally condensed web or sheet and cause the compression rollers at the bottom of the hopper to deliver a homogeneous and uniformly thick and condensed bat, the evener or distributer 10 is vibrated upon its pivotal support 13 by any suitable means so as to lay the sheet or web back and forth in the hopper lengthwise of the compression rollers, the effect being that any irregularity or variation in thickness of the sheet or web will disappear in the final bat and the sheet or web be so evenly distributed to the compression rollers that the resulting compressed or condensed bat will be homogeneous and uniform throughout. As one means of thus moving or vibrating the evener or distributer it has connected to it a vibrator arm or rod 18, the other end of said arm being connected at 19 to a crank pin carried by a disk 20 arranged to rotate with a beveled pinion 21, which in turn meshes with a corresponding pinion 22 on the shaft 23, upon which the drum 6 is held, as clearly indicated in Fig. 2. From this construction it will appear that as the apron 5 carries the sheet or web of cotton upward to the delivery end of the support 7, and delivers it into the evener or distributer 10, said evener or distributer will be vibrated to move back and forth so that its discharge end 16 will cause the laterally condensed sheet or web to be laid alternately in opposite directions in the hopper above the compression rollers. Obviously any suitable means may be employed to thus vibrate or move the evener or distributer.

Mounted in suitable bearings at the lower part or discharge part of the hopper 9 are the compression rolls 24, 24, Figs. 1 and 2, one of said compression rolls being adjustably mounted so as to be moved toward and from the other as indicated in Fig. 1 by the slot 25 in the supporting frame. One of the rolls 24, as indicated in Fig. 2, is provided with a sprocket wheel 26, about which passes a sprocket chain 27 which receives motion from a sprocket wheel 28 on the shaft 29, Fig. 4, said shaft receiving motion through the beveled gears 30 and 31 from a suitable driving shaft 32, Fig. 4. From this construction it will appear that the compression rolls 24 are constantly driven in one direction, as indicated by the arrow, Fig. 1, and will feed between them the sheet or web of cotton delivered into the hopper by the evener or distributer.

Suitably supported on the frames 33 are a series of rollers 34 which constitute the baling surfaces against which the top layer of cotton contained in the bale-box presses as the bale-box is vibrated or moved to and fro beneath such rollers as will hereinafter more fully appear. Said rollers 34 are connected and rotate together by the sprocket chain 35 which passes over and engages suitable sprocket wheels 36 connected to each of said rollers 34, as indicated in Fig. 3.

The bale-box, as hereinafter described, is reciprocated back and forth beneath the two sets of rollers 34 to properly lay the cotton layer upon layer in the bale-box, and it follows, therefore, that said rollers 34 must be rotated first in one direction and then in another, so that their surfaces in contact with the cotton shall move in the direction of movement of the bale-box. To effect this alternate rotation first in one and then in the opposite direction of said rollers 34, there is mounted at the side of the framing 33 and preferably between the two middle rollers of the series a gear wheel 37 which meshes with corresponding gear wheels 38 connected to the middle roller 34 of each series, so that rotation of the gear 37 will cause rotation of the said middle rollers 34 and, through the sprocket connection 35, corresponding rotation to the other rollers of the series.

In order to effect the alternate rotation of the rollers first in one and then in the opposite direction, any suitable means may be employed, that in the present instance being formed by a sprocket chain 39 which engages a sprocket wheel 40, Fig. 3, connected with a shaft of the gear 37 and driven from the sprocket wheel 41 on the mangle gear shaft 42, Fig. 4. Mounted on the mangle gear shaft 42 is the mangle gear 43, the teeth of which mesh with the star or traveler wheel 44 on the shaft 45, connected by a universal joint 46 to the shaft 49, Fig. 4. There is nothing essentially new in the mangle gear and its connected and coöperating devices, and it will be understood by those skilled in the art that as the driving shaft 32 rotates the shaft 29 constantly in one direction, the compression rolls 24 through the sprocket chain 27 will be correspondingly rotated in one direction, as indicated by the arrow, and that as the mangle wheel 43 rotates first in one and then in the opposite direction, as usual in this class of devices, the sprocket chain 39, and, consequently the bale forming surface rollers 34, will be moved first in one and then in the opposite direction, as will be clearly understood, the operation being such that when the bale-box, to be presently described, is moved in the direction of the arrow, Fig. 1, the rollers 34 to the left will move in the direction of the arrow and so also will the rollers to the right of the center move in the direction of the arrow, as indicated, until the bale-box has reached the position indicated by dotted lines in Fig. 1, whereupon the rotation of the rollers will be reversed.

In Fig. 1, 47 indicates a revolving platform of usual type, provided with hangers 48 carrying at their lower ends a cross support 49. Pivotally mounted at 50 on the cross supports 49 is the bale-box 51, pivotal connection with the platform being preferably of a detachable nature, and said bale-box being open at its bottom and provided with stops or rests 52 upon which the follower 53 will seat itself when the bale-box has been filled with cotton or the plunger 54 has been lowered out of the bale-box. The follower 53 serves as a support for the lower layers or laps of cotton which form the bale, and is adapted to rest upon the plunger 54 when said plunger is raised in the bale-box, as indicated in Fig. 1, and when said plunger is moved out of the bale-box, the follower 53 rests upon the supports 52 at the bottom of the bale-box.

In order to reciprocate the bale-box back and forth under the bale forming surfaces or rollers 34, the mangle shaft 42 is provided with a suitable pinion 55, with which engages a rack bar 56 connected by a link 57 with the upper portion of the bale-box as at 58. When the mangle shaft 42 is operated, as hereinbefore described, it will be obvious that the bale-box will be swung back and forth on its pivot 50, as indicated by full and dotted lines in Fig. 1.

Connected to the plunger 54 is a plunger operating rod 59 which is in the form of a rack bar having teeth 60 which engage with the teeth of a pinion 61 supported in bearings on the stationary support 62. The opposite side of the rack bar 59 is provided with a recess 63 extending lengthwise thereof, and in this recess the peripheral portion of a guide roller 64 extends to guide the rack bar in its upward and downward movements. The shaft of the guide roller 64 and the shaft 65 of the pinion 61 are preferably connected by ties 66, Fig. 6.

From the construction stated, it will appear that the rack bar 59 connected to the plunger 54 extends through the bottom of the bale-box and is engaged by the pinion 61, being held thereto by the guide wheel 64, and it follows that upon rotation of the pinion 61 longitudinal movement will be imparted to the rack bar 59.

It has already been stated that the bale-box 51 is moved back and forth upon its pivot 50 and that the plunger 54 is inside the bale-box. It follows, therefore, that the rack bar 59 must also have a pivotal support so as to be free to partake of this movement of the bale box. To this end the rack bar 59 is pivotally jointed to the plunger 54 at 67 and passes through a guide sleeve 68 pivotally mounted at 69, Figs. 1 and 6, upon the stationary support 62, there being sufficient play between the pinion 61 and the guide wheel 64 to permit the necessary pivotal motion of the rack bar with the guide sleeve 68 around the pivotal connection 69. It will thus appear that the plunger operating devices are not carried in and as part of the bale-box but are preferably mounted at a point below the bale-box, so that when the plunger 54 has been moved downward out of the bottom of the bale-box, it may occupy a position as shown by the dotted lines 54 in Fig. 1, said position indicating the lower limit of movement of the plunger 54 to clear the bale-box and allow it, with the bale frame 47, to be turned to the finishing side of the press as is usual in this class of machines.

In order to positively raise and lower the plunger 54 there is a shaft 70 suitably mounted in a bearing 71, Fig. 1, at one side of the machine and loosely sustained in bearings 72 adjacent the rack bar, said bearings 72 permitting the shaft 70 to be raised or lowered to carry the worm 73 into engagement with and out of engagement from the worm wheel 74 mounted on the shaft 65 of a pinion 61, said lifting motion of the shaft 70 being permitted by a universal joint 75 in the shaft 70. The shaft 70 has connected thereto a belt pulley 76, by which it may be driven from any suitable source of power.

Connected to the shaft 70, as at 77, Fig. 1, is a lifting rod 78 connected with a treadle lever 79 above the flooring 80, so that an operator standing upon the platform 80 may by his foot depress the free end of the treadle lever 79 and raise the shaft 70 and the worm 73 so as to free the worm wheel 74 and consequently the pinion 61. This action may be desirable when the plunger 54 is to be run up into the bale-box, and to effect such automatic raising movement of the plunger a weight W, Fig. 1, is connected to a flexible cord or chain 81 which passes over suitable guide pulleys 82 and 83, and may be connected to the rack bar 60 near its lower end as will be readily understood, the action being such that when the worm 73 is disengaged from the worm wheel 74 the weight W will be sufficient to raise the rack 60 and the plunger 54, and when the worm 73 is in engagement with the worm wheel 74 that the said rack 60 will be positively moved to lower the plunger 54, for instance, by means of the driving pulley 76.

It is desirable on the successive reciprocations of the bale-box that the fold of the bat or cotton shall be uniformly laid at each side of the bale-box. That is to say, it is desirable that the end fold of the various layers shall be superposed one upon the other and evenly laid throughout the entire width of the bat. To secure this end the middle rollers 34 of each set of bat forming rollers is provided with a set of starting fingers 84, that is, fingers that will start the fold of the bat on each change of direction of reciprocation of the bale-box. These starting fingers 84 are preferably arranged in a single line lengthwise at each of the middle rolls 34 and are constructed so that, as said fingers pass downward in the line of feed of the bat toward the bale-box, they will be projected to engage the bat, and as they move down to the horizontal position over the layer of cotton or bat, they will be withdrawn from engagement therewith, thus insuring an even fold to the bat and yet obviating any lifting or tearing of the material from the bat as the rollers 34 continue to revolve. As one means of causing this action of the starting fingers 84, each of the middle rollers 34 is mounted in its support 33, as indicated in Fig. 3, that is, said rollers are formed preferably hollow and through each extends a shaft 85 having crank portions 86 which are embraced by the inner ends 87 of the stop fingers 84, as indicated in Figs. 2 and 5. The shaft 85, Fig. 2, is held from rotating at one end as by a set screw 88, Fig. 2, and affords a bearing also at 89 for one end of the roller 34, at the left of Fig. 2. At its opposite end the shaft 85 is supported in a seat 90 of the end journal 91 of the roller 34, said journal 91 being supported in suitable bearings in the frame 33 and carrying the gear 38 by which said roller is rotated alternately in said directions as hereinbefore already explained.

From the construction as herein described as one form or embodiment of the invention it will be seen that the sheet or web of cotton as it comes from the source of supply is laid back and forth in the hopper above the compression rollers, and that any inequality in thickness at various portions of the sheet or web will be so distributed lengthwise of the rollers as to cause all transverse sections of the final bat as it comes from the compression rollers to be of uniform density and thickness. It will also be noted that by reciprocation of the bale-box instead of reciprocating the bale forming surfaces, as heretofore, and the mounting of the plunger pivotally below the bale-box, as already described, there is provided a press of simple construction wherein the uniform character of bat may be secured and the plunger with its positive operating devices be under complete and simple control. It will be obvious also to those skilled in the art that various changes may be made in the details characterizing the present invention, which, as regards its essentials, is definitely pointed out in the claims.

What is claimed is:—

1. In a cotton baling press, the combination of a hopper, compression rollers for compacting the material as it passes from said hopper, a source of cotton supply, delivery means for delivering the cotton from said supply to the hopper, and devices for causing said delivery means to lay the cotton back and forth in the hopper above the compression rollers to equalize the thickness of the bat delivered by the compression rollers.

2. In a cotton baling press, the combination of a source of cotton supply, a hopper, compression rollers for compacting the material as it passes from said hopper, bale forming mechanism for receiving the cotton delivered by the compression rollers, delivery means for delivering the cotton from said source of supply to said hopper and means for causing said delivery means to lay the cotton back and forth in the hopper above the compression rollers to equalize the thickness of the bat delivered by the compression rollers to the bale forming mechanism.

3. In a cotton baling press, the combination of a hopper, compression rollers to compact the material delivered from the hopper by said compression rollers, bale forming mechanism to receive the material delivered by the compression rollers, a source of cotton supply, means for receiving the cotton from said source of supply, and operating devices for said means to move the latter back and forth with relation to the hopper and cause the cotton to be delivered to the compression rollers in substantially uniform thickness throughout the length of said rollers.

4. In a cotton baling press, the combination of a hopper, compression rollers to compact the material delivered from the hopper by said compression rollers, bale forming mechanism to receive the material delivered by the compression rollers, a source of cotton supply, means for receiving the cotton from said source of supply, and condensing or contracting the same widthwise, and operating devices for said means to move the latter back and forth with relation to the hopper and cause the cotton to be delivered to the compression rollers in substantially uniform thickness throughout the length of said rollers.

5. In a baling press, the combination of a hopper, compression rollers to condense the cotton delivered from the hopper, a source of cotton supply, a bat evener or distributer disposed between the cotton supply and hopper, extending into the hopper and adapted to receive the cotton from the source of supply, and means for moving the evener or distributer back and forth in the hopper in a direction lengthwise of the compression rollers to cause the compression rollers to deliver a bat of uniform thickness throughout the width thereof.

6. In a baling press, the combination of a hopper, compression rollers to condense the cotton delivered from the hopper, a source of cotton supply, an evener or distributer pivotally mounted and having its delivery end extending into the hopper, means for swinging the delivery end of the evener or distributer in a direction lengthwise of the compression rollers to enable a uniform thickness of bat to be delivered thereby, and bale forming mechanism to receive the bat delivered by said compression rollers.

7. In a baling press, the combination of a stationary hopper, a bale-box pivotally supported below said hopper, a plunger extending into said bale-box and having a pivotal support independent of the bale-box, and means for swinging the bale-box on its pivotal supports below the stationary hopper.

8. In a baling press, the combination of a stationary hopper, a bale-box pivotally supported below said hopper, a plunger extending into said bale-box and having a pivotal support independent of the bale-box, means for operating the plunger positively, and means for swinging the bale-box on its pivotal supports below the stationary hopper.

9. In a baling press, the combination of a stationary hopper, a bale-box pivotally supported below said hopper, a plunger extending into said bale-box and having a pivotal support independent of the bale-box and below the supports thereof, and means for swinging the bale-box on its pivotal supports below the stationary hopper.

10. In a baling press, the combination of bale forming mechanism comprising devices for supporting the bale as it is formed, bale forming surfaces, means for moving one of said parts with relation to the other to lay the cotton in layers, starting fingers carried by the bale forming surfaces to start the lap in the backward fold at the commencement of each movement, and means for then withdrawing the fingers from engagement with the cotton.

11. In a baling press, the combination of a hopper, a bale-box pivotally supported below the hopper, a counterbalanced plunger adapted to move into and out of the bale-box, plunger operating means pivotally mounted independent of the bale-box, and means for swinging the bale-box on its pivotal supports below the hopper.

12. In a baling machine, the combination of a hopper, compression means for delivering cotton from the hopper, a source of cotton supply, an evener or distributer disposed between the source of cotton supply and hopper, said evener or distributer extending into said hopper and resting upon one wall thereof, and means for moving the evener or distributer back and forth within the hopper to equalize the density of the bat delivered by the said compression means.

13. In a baling press, the combination of bale forming mechanism comprising bale forming rollers and a bale-box opposed to each other, means for moving one of said parts with relation to the other to lay the cotton in consecutive layers, starting fingers carried by the center of the bale forming rollers to start the bat of cotton in the backward fold at the commencement of each movement, and means for projecting and withdrawing said fingers to engage and disengage the cotton.

In testimony whereof, I have signed my name to this specification, in the presence of two subscribing witnesses.

AVERY H. THOMAS.

Witnesses:
E. C. DRAKE,
W. F. CRAIG.